(12) United States Patent
Miyairi et al.

(10) Patent No.: US 7,120,808 B2
(45) Date of Patent: Oct. 10, 2006

(54) INFORMATION PROCESSING APPARATUS AND METHOD, AS WELL AS PROGRAM

(75) Inventors: Atsushi Miyairi, Tokyo (JP); Shinichi Numata, Kanagawa (JP); Katsuhiro Hashimoto, Tokyo (JP); Shojiro Sato, Kanagawa (JP); Takaaki Morimura, Tokyo (JP); Masataka Suzuki, Tokyo (JP); Soichi Sato, Tokyo (JP); Tamaki Kojima, Tokyo (JP); Hidenori Yamaji, Tokyo (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 10/677,308

(22) Filed: Oct. 3, 2003

(65) Prior Publication Data
US 2004/0133816 A1  Jul. 8, 2004

(30) Foreign Application Priority Data
Oct. 10, 2002 (JP) .............................. 2002-296967

(51) Int. Cl.
*G06F 1/28* (2006.01)
*G06F 13/14* (2006.01)

(52) U.S. Cl. ...................... 713/322; 713/300; 713/310; 713/320; 713/321; 713/323; 713/324

(58) Field of Classification Search ................ 713/300, 713/310, 320–324, 340
See application file for complete search history.

(56) References Cited

U.S. PATENT DOCUMENTS

| | | | | |
|---|---|---|---|---|
| 5,408,402 | A | * | 4/1995 | Nonnenmacher ........ 363/21.09 |
| 6,367,023 | B1 | * | 4/2002 | Kling et al. ................ 713/340 |
| 6,704,879 | B1 | * | 3/2004 | Parrish ....................... 713/322 |
| 2004/0049704 | A1 | * | 3/2004 | Yang et al. ................. 713/300 |

* cited by examiner

*Primary Examiner*—A. Elamin
(74) *Attorney, Agent, or Firm*—Oblon, Spivak, McClelland, Maier & Neustadt, P.C.

(57) ABSTRACT

Performing power saving control which can be inherited and standardized easily, and which keeps power devices from having to become larger is made possible. A current In flowing through an electrical path is detected as a voltage Vs by a current detection section, and is outputted as a voltage Vout by an amplifying section. When a level corresponding to the voltage Vout exceeds a limit level, a power limit detection section outputs a power limit detection signal. When a controller receives the power limit detection signal via a detection signal holding section, the controller outputs a throttle control command signal. When a chip set receives the throttle control command signal, the chip set initiates throttle control that lowers the clock frequency of a CPU. The present invention may be applied to laptop personal computers.

12 Claims, 5 Drawing Sheets

INFORMATION PROCESSING APPARATUS AND METHOD, AS WELL AS PROGRAM

CROSS REFERENCE TO RELATED APPLICATIONS

The present document claims priority to Japanese Priority Document JP2002-296967, filed in the Japanese Patent Office on Oct. 10, 2002, the entire contents of which are incorporated herein by reference to the extent permitted by law.

BACKGROUND OF THE INVENTION

1. Field of the Invention

The present invention relates to an information processing apparatus and method, as well as a program, and more specifically to an information processing apparatus and method, as well as a program in which performing power-saving control of the information processing apparatus which keeps a power device from having to be made larger and which can be inherited and standardized easily is made possible.

2. Description of the Related Art

In recent years, CPUs (Central Processing Units) with a high frequency, and relatively high power consumption are becoming popular. Power devices of information processing apparatuses in which such CPUs are used are designed to meet the power supplying performance demanded in accordance with the increasing power consumption, and tend to be larger and more costly. In other words, a power device is designed taking the maximum amount of power consumption when all of the CPU, other chips, built-in drives, devices that may be connected to external device connector terminals, and the like are operating to their fullest capacity into consideration.

On the other hand, measures for decreasing power consumption by information apparatuses have been devised. Such measures include, for example, detecting when the apparatus is operating on batteries and altering the operation mode of the CPU to lengthen the operation time, or adjusting the backlight of an LCD (Liquid Crystal Display) to decrease power consumption. Another example is where the temperature of the CPU is detected, and when it exceeds a predetermined temperature, the operation mode of the CPU is altered, thereby preventing the CPU from being destroyed or from running out of control due to its own heat, and thus ultimately lowering power consumption (see, for example, patent document 1).

[Patent Document 1]

Japanese International Application Publication No. 2002-269272.

SUMMARY OF THE INVENTION

In reality, finding an information processing apparatus in a state where it is operating at maximum power consumption is a rare occurrence. For this reason, for the most part, a power device that is designed to be able to handle the maximum amount of power consumption in fact has too high a performance.

For example, in portable information processing apparatuses such as mobile computers or laptop personal computers (hereinafter, they will be referred to as laptop PCs for brevity where appropriate) in which power devices such as batteries can be used besides AC power adaptors so as to be portable, when a large power device is mounted, the merit of being portable cannot be taken advantage of to the fullest.

Under such circumstances, in conventional control methods for reducing power consumption, there is an issue in that lowering the maximum amount of power consumption while keeping it possible to operate the CPU, for example, at its fullest capacity is difficult. In addition, there is also a problem in that altering the operating mode of the CPU or performing control that reduces the maximum amount of power consumption by adjusting the LCD back light requires the mediation of an operating system or complex parameters, and thus, inheriting control from an information processing apparatus of a different model is tedious, and standardization of control is difficult.

The present invention is proposed in view of such circumstances, and contributes to reducing the maximum amount of power consumption, to making inheriting and standardization easy, and to keeping power devices from becoming larger.

An information processing apparatus related to an embodiment of the present invention includes: detection means for detecting a current flowing through a predetermined electrical path inside the information processing apparatus; first output means for outputting, when a current level detected by the detection means exceeds a limit level that is set in advance, a first signal indicating so; second output means for outputting, when the first signal is outputted by the first output means, a second signal for commanding that the clock frequency of the information processing apparatus be reduced; and frequency control means for so controlling the clock frequency of the information processing apparatus that, when the second signal is outputted by the second output means, it is reduced.

The frequency control means may control the clock frequency of the information processing apparatus so that it is reduced, utilizing a throttling function of the information processing apparatus, after a first period of time from when the second signal is outputted by the second output means has elapsed. There may further be provided terminating means for terminating control by said frequency control means at the point where a second period of time, which is set based on the first period of time, has elapsed from when control by the frequency control means is begun.

The electrical path is a power line through which power is supplied from a predetermined power supplying device to the information processing apparatus. The second period of time may be set in advance based on the first period of time so that the average power consumed by the information processing apparatus within the range of the peak power of the power supplying device, which is defined by specification, and the duty rate does not exceed a level corresponding to the limit level.

The second output means may include a microcomputer, and there may further be provided holding means for holing the first signal outputted by the first output means for a third period of time that is equal to or greater than the polling cycle of the microcomputer, and outputting it. The second output means may output the second signal when it is detected that the holding means is holding the first signal.

The electrical path may be, of power lines for supplying power from the predetermined power supplying apparatus to the information processing apparatus, a current passing line through which all the current consumed by the information processing apparatus flows, and a limit value for the current flowing through the current passing line may be set in advance based on the capacity of the power supplying apparatus. The detection means may detect all the current flowing through the current passing line that is to be consumed by the information processing apparatus. The first output means may output the first signal when the current level detected by the detection means exceeds the limit level corresponding to the limit value for the current that is set in advance.

The information processing apparatus may use a plurality of kinds of power supplying devices, and a limit value for the current flowing through the current passing line is set in advance for each of the plurality of kinds of power supplying devices based on its capacity. When the information processing apparatus uses a first power supplying device, the first output means may output the first signal when the current level detected by the detection means exceeds a first limit level corresponding to a limit value for the current that is set in advance with respect to the first power supplying device. When the information processing apparatus uses a second power supplying device, the first output means may output the first signal when the current level detected by the detection means exceeds a second limit level corresponding to a limit value for the current that is set in advance with respect to the second power supplying device.

The first power supplying device may be a power supplying device for commercial AC power, and the second power supplying device may be a battery.

The detection means may include a detector resistor for detecting a current passing through the current passing line as a voltage value across both ends thereof. The first output means may include: a comparator for comparing values of a first input to which a current level detected by the detection means is inputted and a second input to which the limit level is inputted, and outputting the first signal when the value of the first input exceeds the value of the second input; first supplying means for computing a current level based on the voltage across both ends of the detector resistor when the current actually consumed at that point by the information processing apparatus is flowing through the current passing line and on an output voltage of the power supplying device, and for inputting the computed current level to the first input of the comparator; and second supplying means for supplying, when a current of the limit value that is set in advance based on the capacity of the power supplying device is flowing through the current flowing line, to the second input of the comparator as a limit level a level that corresponds to the current level supplied to the first input of the comparator from the first supplying means.

There may further be provided a CPU, and a sensor for measuring the temperature of the CPU and outputting the measured value. The second output means may also output the second signal when the measured value outputted by the sensor exceeds a predetermined value.

There may further be provided a CPU having a control terminal shared with a monitor, and which executes control for the control terminal where its own operation is periodically and repeatedly paused in a predetermined cycle. When the second signal is outputted by the second output means, the CPU may obtain the second signal via the control terminal, and may perform control for the control terminal.

There may further be provided a video controller chip that has a predetermined power saving function and which executes that power saving function when the second signal is outputted by the second output means.

An information processing method for an information processing apparatus related to an embodiment of the present invention includes: a detection step for detecting a current flowing through a predetermined electrical path in the information processing apparatus; a first output step for outputting a first output signal when the current level detected in the detection step exceeds a predetermined limit level; a second output step for outputting, when the first signal is outputted in the first output step, a second signal for commanding that a clock frequency of the information processing apparatus be reduced; and a frequency control step for controlling, when the second signal is outputted in the second output step, so that a clock frequency of the information processing apparatus is reduced.

A program related to an embodiment of the present invention causes a computer for controlling an information processing apparatus to execute: a detection step for detecting a current flowing through a predetermined electrical path in the information processing apparatus; a first output step for outputting, when the current level detected in the detection step exceeds a predetermined limit level, a first output signal indicating so; a second output step for outputting, when the first signal is outputted in the first output step, a second signal for commanding that a clock frequency of the information processing apparatus be reduced; and a frequency control step for controlling, when the second signal is outputted in the process of the second output step, so that the clock frequency of the information processing apparatus is reduced.

In the information processing apparatus and method, as well as the program described above, when the level of the current flowing through the predetermined electrical path inside the information processing apparatus exceeds the limit level that is set in advance, a first signal indicating that fact is outputted. The first signal serves as a trigger, the second signal that commands the lowering of the clock frequency is outputted, and control is initiated so that the clock frequency of the information processing apparatus is reduced.

In an embodiment of the information processing apparatus of the present invention, the clock frequency may be reduced based on the current flowing inside the information processing apparatus, or the clock frequency may be reduced based on a current flowing outside the information processing apparatus and which is supplied to the information processing apparatus. In addition, the clock frequency may be reduced by making an overall judgment on currents flowing both inside and outside the information processing apparatus.

According to the present invention, throttling functions may be utilized. More specifically, power saving control for an information processing apparatus which utilizes throttling functions, which keeps a power device from becoming larger, and which may be inherited and standardized easily can be performed.

DETAILED DESCRIPTION OF THE PREFERRED EMBODIMENTS

Figure 1:
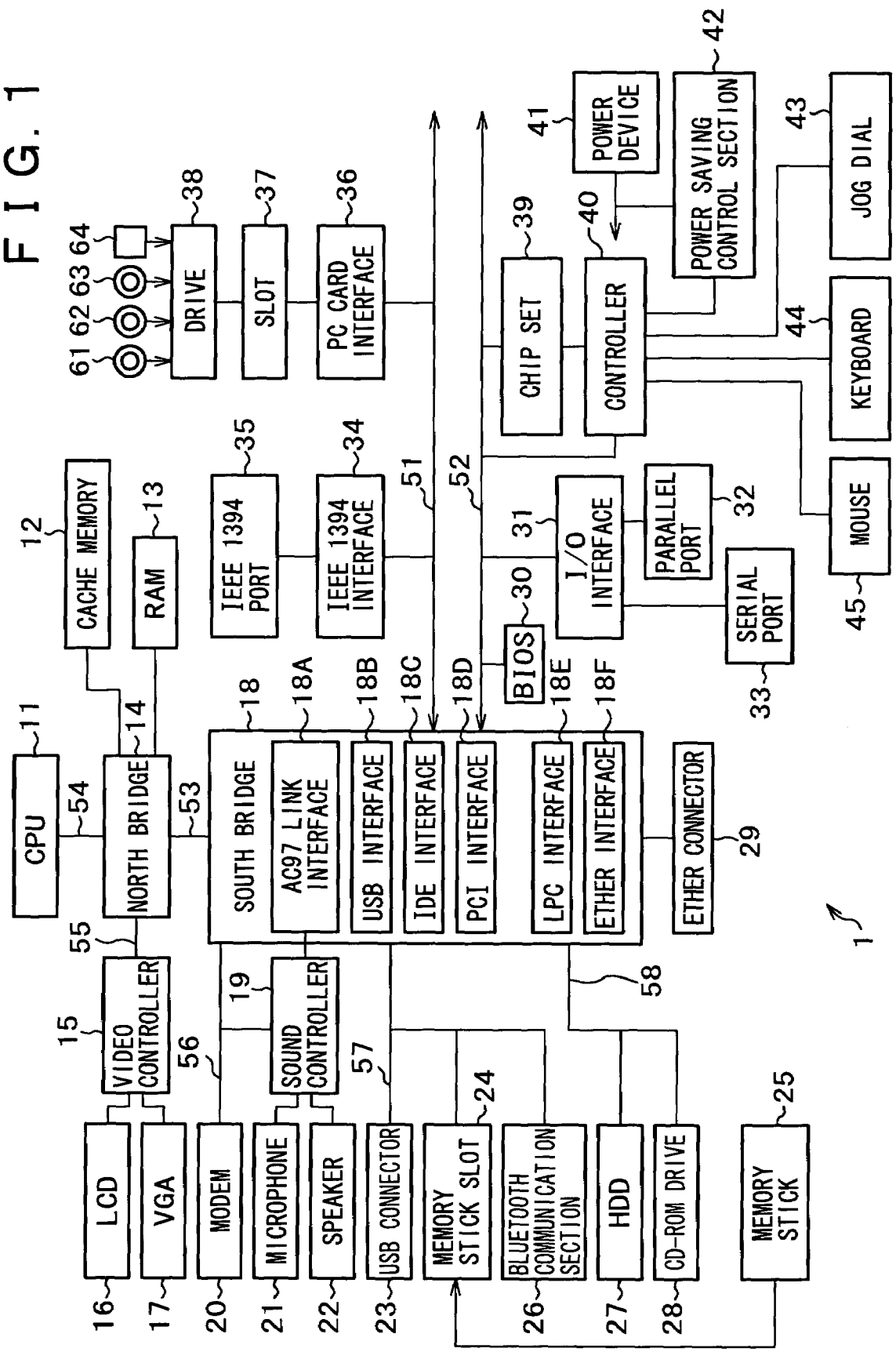
FIG. 1 is a block diagram indicating a configuration example of an information processing apparatus to which the present invention is applied.

FIG. 1 shows a configuration example of an information processing apparatus to which the present invention is applied.

In an information processing apparatus 1 shown in FIG. 1, a CPU 11 may include, for example, an Intel Pentium (registered trademark) processor or the like, and is connected to a front side bus (FSB) 54. Further, a north bridge 14 is connected to the FSB 54. The north bridge 14 has an AGP (Accelerated Graphics Port) 55 and is connected to a hub interface 53.

The north bridge 14 may include, for example, a 440BX, which is an Intel AGP host bridge controller, and controls the CPU 11, a RAM (Random Access Memory) 13 (a so-called main memory), and the like. Further, the north bridge 14 controls a video controller 15 via the AGP 55. The video controller 15 controls an LCD (Liquid Crystal Display) 16 or a VGA (Video Graphics Array) display 17 (hereinafter referred to as VGA 17).

The video controller 15 receives data (such as image data or text data) supplied from the CPU 11, and generates image data corresponding to the received data or stores the received data as is in a built-in video memory (not shown). The video controller 15 displays on the LCD 16 or the VGA 17 an image corresponding to the image data stored in the video memory. The LCD 16 or the VGA 17 displays images and text based on the data supplied from the video controller 15.

The north bridge 14 is also connected to a cache memory 12. The cache memory 12 includes a memory that can perform write and read operations that are faster relative to the RAM 13 including, for example, an SRAM (Static RAM) or the like, and caches (temporarily stores) programs or data that the CPU 11 uses.

In addition, the CPU 11 includes internally a primary cache which the CPU 11 controls itself and which can operate faster than the cache memory 12.

The RAM 13 may include, for example, a DRAM (Dynamic RAM), and stores programs executed by the CPU 11 or data that is necessary for the operation of the CPU 11. More specifically, the RAM 13, for example, stores an OS (Operating System) or an Internet program, which are loaded from the HDD 27 once start-up is complete.

An OS is a program that controls the basic operations of a computer, examples of which include Microsoft's Windows (registered trademark) XP, Apple Computer's Mac OS (registered trademark) or the like.

The north bridge 14 is also connected to a south bridge 18 via the hub interface 53. The south bridge 18 may include, for example, Intel's PIIX4E, and has built therein an AC97 link interface 18A, a USB (Universal Serial Bus) interface 18B, an IDE (Integrated Drive Electronics) interface 18C, a PCI (Peripheral Component Interconnect) interface 18D, an LPC (Low Pin Count) interface 18E, an Ether interface 18F and the like.

The south bridge 18 controls various I/O (Input/Output) operations by controlling, for example, devices connected to the AC97 link bus 56, the USB bus 57, or the IDE bus 58.

A modem 20 and a sound controller 19 are connected to the AC97 link bus 56. The modem 20 is connected to a public network, and performs communication processes via the public network or the Internet (neither are shown). The sound controller 19 imports audio from a microphone 21, generates data corresponding to the audio, and outputs it to the RAM 13. In addition, the sound controller 19 drives a speaker (or speakers) 22 and outputs audio from the speaker 22.

A USB connector 23 is connected to the USB bus 57 of the south bridge 18, thus making various USB devices connectable. In addition, via the USB bus 57, a memory stick slot 24 and a Bluetooth communication section 26 are connected. A Memory Stick (registered trademark) 25 can be inserted into the memory stick slot 24.

The Memory Stick 25 is a kind of a flash memory card developed by Sony Corporation. In this Memory Stick 25, a flash memory device which is a kind of an EEPROM (Electrically Erasable and Programmable Read Only Memory) that is a rewritable and erasable non-volatile memory is housed within a small and thin plastic case, whose dimensions are 21.5×50×2.8 [mm, length×width×thickness]. Various data, such as images, audio, music and the like, can be written and read via a 10-pin terminal. The Bluetooth communication section performs communications according to Bluetooth specifications.

The USB interface 18B transmits and receives data to and from an external device connected via the USB bus 57.

The IDE interface 18C includes two so-called IDE controllers, which are a first primary IDE controller and a secondary IDE controller, as well as a configuration register and the like (none of which are shown).

The HDD 27 is connected to the primary IDE controller via the IDE bus 58. When a so-called IDE device, such as a CD-ROM drive 28 or an HDD (not shown), is connected to the other IDE bus, that IDE device becomes electrically connected to the secondary IDE controller.

An Ether connector 29 is connected to a network such as a LAN (Local Area Network). The Ether interface 18F transmits data to a network connected to the Ether connector 29, while also receiving data therefrom.

ABIOS (Basic Input Output System) 30, an I/O interface 31, a chip set 39 and a controller 40 are connected to an LPC bus 52.

The BIOS 30 is a group of programs in which basic operation commands for the information processing apparatus 1 are put together, and is stored in, for example, a ROM (Read Only Memory). In addition, the BIOS 30 controls the handling (inputting and outputting) of data between the OS or application programs and peripheral devices.

A parallel port 32 and a serial port 33 are connected to the I/O interface 31, and data is handled between the I/O interface 31 and devices connected to these ports.

The controller 40 is connected to the chip set 39. Input devices such as a jog dial 43, a keyboard 44, and a mouse 45, as well as a power saving control section 42 or the like are connected to the controller 40.

The chip set 39 is capable of performing control which is used mainly to suppress the generation of heat by the CPU 11, and which is referred to as a so-called throttling function. More specifically, the chip set 39 performs control whereby the clock frequency is reduced on the whole by sometimes not driving the CPU 11 (in other words, control in which the clock frequency, as an average value, is reduced by driving the CPU 11 intermittently). Hereinafter, such control by the chip set 39 will be referred to as throttle control.

The controller 40 may include a microcomputer, and controls input devices such as the jog dial 43, the keyboard 44 and the mouse 45. Further, in the present embodiment, as will be described later, the controller 40 utilizes the throttle control by the chip set 39 and controls, with the power saving control section 42, power that is supplied from a power device 41.

The power device 41 is a device for supplying power to the whole system of the information processing apparatus, and in this example, the power device 41 may be, for example, an AC power adaptor or a battery. Details of the power saving control section 42 will be described with reference to FIG. 2.

A PC card interface 36 and an IEEE (Institute of Electrical and Electronics Engineers) 1394 interface 34 are connected to a PCI bus 51.

The IEEE 1394 interface 34 transmits and receives data that conforms to the IEEE 1394 specifications (data that is stored in packets).

The PC card interface 36 supplies data supplied from a device connected to a slot 37 (a card that is not shown) to the CPU 11 or the RAM 13, and also outputs data supplied from the CPU 11 to the card connected to the slot 37.

As shown in FIG. 1, a drive 38 may also be connected to the slot 37 as needed. In such a case, the drive 38 is connected to the PCI bus 51 via the slot 37 and the PC card interface 36. The drive 38 reads data that is recorded on a loaded magnetic disk 61, optical disk 62, magneto-optical disk 63 or semiconductor memory 64, and supplies the data read to the RAM 13. In addition, data that is generated by processes by the CPU 11, may be stored on the magnetic disk 61, the optical disk 62, the magneto-optical disk 63 or the semiconductor memory 64 loaded into the drive 38.

As mentioned above, in recent years, CPUs 11 that have a high frequency and consume a relatively large amount of power have become popular. In addition, the information processing apparatus 1, such as a portable mobile computer or laptop PC, that is configured as shown in FIG. 1 has become more commonplace. In order to make them portable, laptop PCs are made operable on batteries as well, and not only AC power adaptors, as the power device 41.

The power device 41 is designed taking the maximum amount of power consumed when all of the CPU 11 of the information processing apparatus 1, other chips (not shown), the built-in drive 38, the CD-ROM drive 28 as a device that may be connected to the external device connecter terminal and the IEEE 1394 interface 34 are operating to their fullest capacity.

In the design specification of the power device 41, the rated power value, the peak power value, the peak power duration, the ratio of the period when the rated power is not exceeded to the period when the rated power is exceeded (duty rate) and the like are defined.

When such a CPU 11 with a high frequency and power consumption is used in a laptop PC (the information processing apparatus 1), it is necessary to reduce the overall power consumption by the information processing apparatus 1 in order to extend battery life or to make the power device 41 smaller.

For this reason, in the information processing apparatus 1, as will be described later, the total current consumed by the information processing apparatus 1 (the current actually flowing) is detected, and when the detected current level exceeds the limit level that is set in advance, the information processing apparatus 1 performs control whereby the clock frequency of the CPU 11 is reduced and power consumption is made smaller. Hereinafter, such control will be referred to as power saving control for brevity. The method for lowering the clock frequency of the CPU 11 is not limited in particular, and, for example, the clock frequency itself may be reduced, but in the present example, the above mentioned throttle control is adopted.

Figure 2:
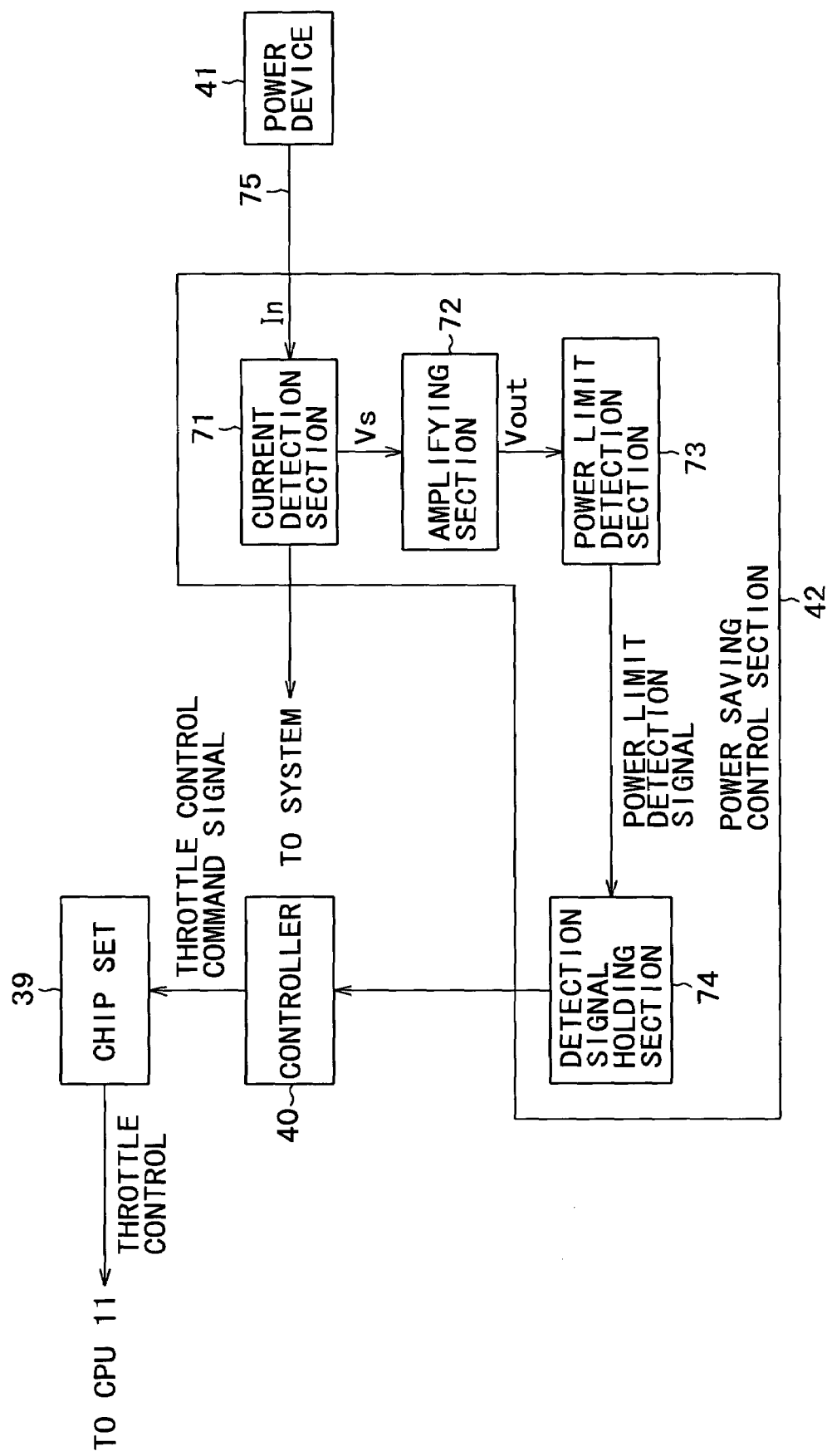
FIG. 2 is a block diagram indicating a configuration example of a chip set for performing power-saving control, a controller, a power-saving control section and a power device in the information processing apparatus in FIG. 1.

Of the information processing apparatus 1 shown in FIG. 1, FIG. 2 shows a detailed configuration example of the main portion that executes such power saving control.

In other words, as shown in FIG. 2, the power saving control related to the present invention is performed by the chip set 39, the controller 40, the power device 41, the power saving control section 42 and the CPU 11 (FIG. 1), which is not shown in FIG. 2.

The power saving control section 42 includes a current detection section 71, an amplifying section 72, a power limit detection section 73 and a detection signal holding section 74.

The power device 41 of the present example, as described above, may include an AC power adaptor or a battery, and supplies power to the information processing apparatus 1. More specifically, the power device 41 supplies all of the current consumed by the information processing apparatus (FIG. 1) to the system (the information processing apparatus 1) via an electrical path 75 (as well as the current detection section 71 described later). In other words, the electrical path 75 is so placed inside the information processing apparatus 1 that all of the current consumed by the information processing apparatus 1 flows through it.

Figure 3:
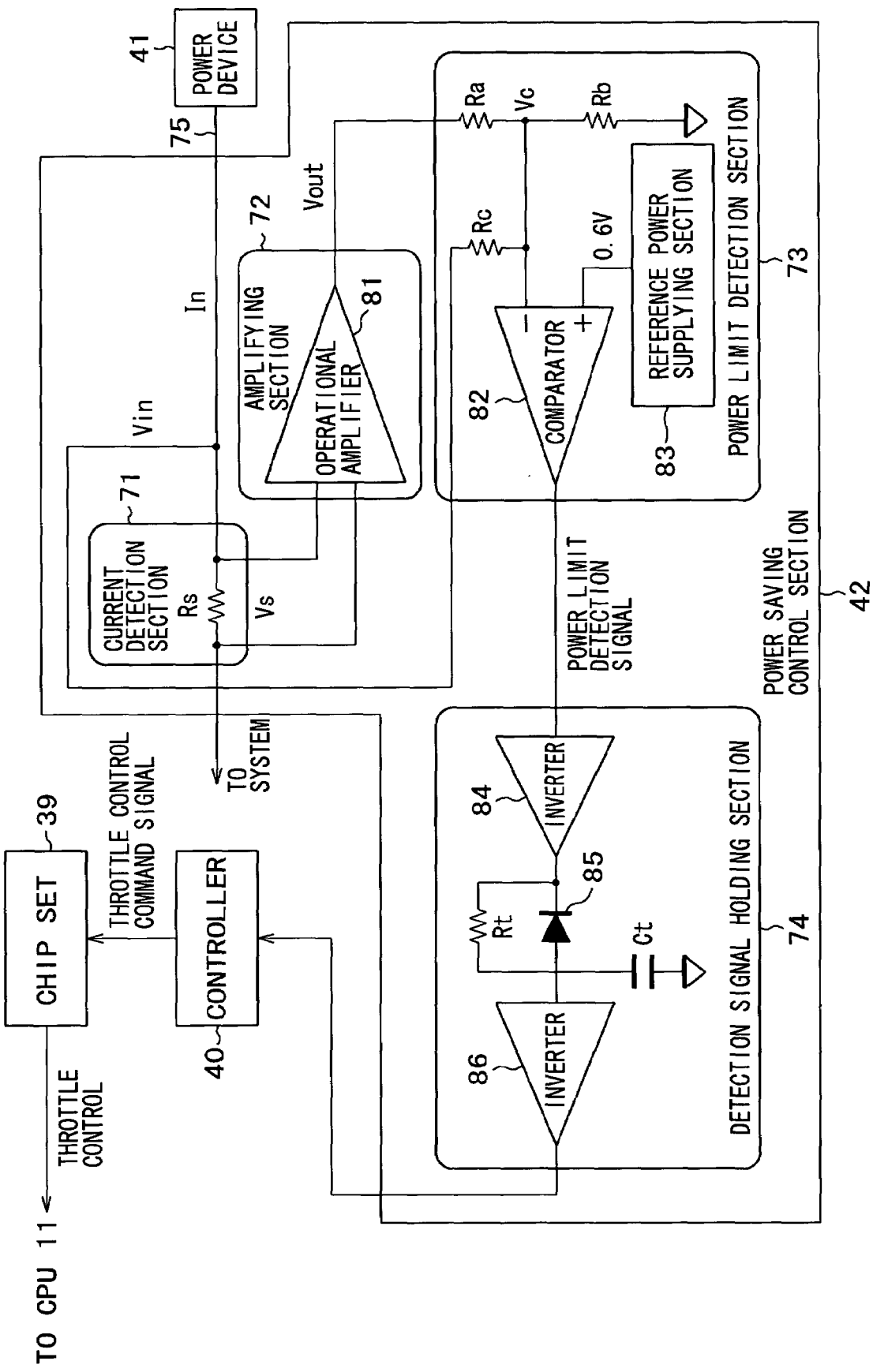
FIG. 3 is a block diagram showing a detailed configuration example of the power-saving control section in FIG. 2.

A detailed configuration example of the power saving control section 42 is shown in FIG. 3. Details of the power saving control section 42 will be described with reference to FIG. 3.

The current detection section 71 includes a detector resistor Rs. The detector resistor Rs detects a current In supplied from the power device 41 and flowing through the electrical path 75 as a voltage across both ends of itself. In other words, the current detection section 71 detects the current In as a voltage Vs expressed as follows by equation (1).

$$Vs = In \times Rs \tag{1}$$

The amplifying section 72 includes, for example, an operational amplifier 81 or the like, and it amplifies the detected voltage Vs detected by the current detection section 71 by a predetermined gain G (multiplies the voltage value by G), and outputs it to the current limit detection section 73 as Vout. In other words, the output voltage Vout of the amplifying section 72 becomes the value expressed by equation (2). In equation (2), G is assumed to be an arbitrary integer, and in the present example is 20, for example.

$$Vout = G \times Vs \tag{2}$$

The output voltage Vout of the amplifying section 72 is inputted to the power limit detection section 73, and the power limit detection section 73 computes the level of the current In flowing through the electrical path 75 (the total current consumed by the information processing apparatus 1) based on the inputted output voltage Vout. If the level of the computed current In exceeds a limit level (a level corresponding to the limit value of the current In) that is set in advance, a signal indicating so is outputted to the detection signal holding section 74.

In other words, since the power device 41, in general, is a constant voltage source, it is possible to calculate the power consumed by the information processing apparatus from the current In flowing through the electrical path 75. Therefore, when the current In actually flowing through the electrical path 75 at some point exceeds a current corresponding to the rated power (since, in the present example, the rated power is used as a limit value, it will be referred to as limit power Pinplimit) of the power device 41 (hereinafter, such a current will be referred to as limit current Iinplimit), the power limit detection section 73 detects that the power consumed by the information processing apparatus 1 at that point exceeds the limit power Pinplimit, and outputs a signal indicating so (hereinafter, such a signal will be referred to as a power limit detection signal) to the detection signal holding section 74.

There is a relationship between the limit power Pinplimit and the limit current Iinplimit as expressed by equation (3). In equation (3), Vin denotes the output voltage of the power device 41.

$$Pinplimit = Vin \times Iinplimit \qquad (3)$$

The power limit detection section 73 is not limited to any configuration in particular so long as it is capable of outputting the power limit detection signal. In the present example, it includes, for example as shown in FIG. 3, a resistor Ra, a resistor Rb, a resistor Rc, a comparator 82 and a reference power supplying section 83.

One end each of the resistors Ra through Rc is connected to the negative input (−) of the comparator 82. Also the ends of the resistor Ra and the resistor Rb connected to the negative input (−) of the comparator 82 are also connected to each other, the other end of the resistor Ra is connected to the output end of the amplifying section 72 (the operational amplifier 81), and the other end of the resistor Rb is grounded. In other words, one end of a serial circuit in which the resistor Ra and the resistor Rb are connected serially is connected to the output end of the amplifying section 72 (operational amplifier 81), and the other end is grounded. Also the negative input (−) of the comparator 82 and one end of the resistor Rc are connected to the resistor Ra and the Resistor Rb between the two (at the connective ends of the two). The other end of the resistor Rc is connected to a predetermined portion of the electrical path 75 between the power device 41 and the current detection section 71 (in other words, the portion where the output voltage Vin of the power device 41 is maintained).

Assuming that the output voltage Vout of the amplifying section 72 obtained at limit power Pinplimit is Va, that the output voltage Vin of the power device 41 that is arbitrarily set is Vb, further that the output voltage Vin when an AC adaptor is used as the power device 41 is Vb1, that the output voltage Vin when a battery is used as the power device 41 is Vb2, that the output voltage Vout of the operational amplifier 81 obtained from the limit current Iinplimit at the output voltage Vb1 is Va1, and that the output voltage Vout of the operational amplifier 81 obtained from the limit current Iinplimit at the output voltage Vb2 is Va2, then Ra, Rb and Rc can be calculated through the following equations (4) and (5) where a voltage Vc between Rb and Rc, which is inputted to the negative input (−) of the comparator 82 at limit power Pinplimit, is to be 0.6 [V].

$$Ra = Rb\{(Vb2-Vc2)(Vc-Va1)-(Vb1-Vc)(Vc-Va2)\}/ \\ \{(Vb1-Vc)-(Vb2-Vc)\}Vc \qquad (4)$$

$$Rc = RaRb(Vb1-Vc)/(Ra+Rb)Vc-RbVa1 \qquad (5)$$

However, taking the comparator input accuracy into consideration, an arbitrary value for Rb is set in advance.

In the present example, it is made possible to use an AC power adaptor and a battery for the power device 41. In general, the limit power (rated power) Pinplimit of an AC power adaptor is often set higher than the limit power (rated power) Pinplimit of a battery. In addition, the output voltage Vin of an AC power adaptor is, in general, often set higher than the output voltage Vin of a battery.

Therefore, in order to make linear control possible where when the output voltage Vin of the power device 41 decreases, the limit power (rated power) Pinplimit thereof also decreases, in the example of FIG. 3, it is arranged such that the voltage Vc at the point where currents are added is inputted to the negative input (−) of the comparator 82. Thus, by having the voltage Vc at the point where the currents of the output voltage Vout of the operational amplifier 81 and the output voltage Vin of the power device 41 are added and the constant voltage of 0.6 [V] supplied from the reference power supplying section 83 compared by the comparator 82, power saving control for each of a plurality of kinds of power devices 41 is made possible.

The detection signal holding section 74 includes an inverter 86 as well as a circuit comprised of an inverter 84, a diode 85, a resistor Rt and a capacitor Ct. In other words, the detection signal holding section 74 supplies the power limit detection signal outputted by the comparator 82 of the power limit detection section 73 to the controller 40, which will be described later, but it holds the outputted power limit detection signal for the duration of a holding time T1 corresponding to time constant Rt/Ct. This holding time T1 will be described later.

Referring back to FIG. 2, once it receives the power limit detection signal from the power saving control section 42, the controller 40 enables throttle control by the chip set 39. Then, the controller 40, makes the chip set 39 maintain throttle control, and once a control maintaining time T3 elapses from the point where throttle control is initiated, throttle control is terminated. Details of the control maintaining time T3 will be described later.

The chip set 39, based on the control by the controller 40, executes and stops throttle control.

How the controller 40 enables throttle control is not limited to any particular method, and in the present example, the controller 40, for example, enables throttle control by the chip set 39 by outputting a throttle control command signal shown in FIG. 2. In other words, while the controller is outputting the throttle control command signal (or while the chip set 39 is receiving the throttle control command signal), the chip set 39 maintains throttle control, and when the controller 40 stops outputting the throttle control command signal (when the chip set 39 stops receiving it), it is assumed that termination of throttle control is commanded, and execution of throttle control is stopped.

Next, power saving control of the information processing apparatus 1 in FIG. 1 (mainly the portion shown in FIG. 2) will be described with reference to the flowchart in FIG. 4.

In step S1, the current detection section 71 in FIG. 2 detects the current consumed by the information processing apparatus 1. In other words, in FIG. 3, as described above, all of the current In consumed by the information processing apparatus 1 is made to flow through the electrical path 75, and that current In is detected as the voltage Vs across both ends of the detector resistor Rs of the current detection section 71 provided along the electrical path 75.

As described above, the detected voltage Vs is amplified by the operational amplifier 81 of the amplifying section 72 by the predetermined gain G (in this example, G=20), and then outputted. Then, the voltage Vc, in which the currents of the output voltage Vout of this operational amplifier 81 and the output voltage Vin of the power device 41 are added, is inputted to the negative input (−) of the comparator 82 as the level of the current In actually flowing through the electrical path 75 at that point. In addition, a constant voltage (0.6V in the example of FIG. 3) supplied from the reference power supplying section 83 is constantly inputted to the positive input of the comparator 82.

In other words, when the added voltage Vc is inputted to the negative input (−) of the comparator 82 as the level of the consumed current, in step S2, the comparator 82 determines whether or not the level of the consumed current (the added voltage Vc) is at or above a predetermined level (the voltage (0.6V) supplied from the reference power supplying section 83).

In step S2, if it is determined that the level of the consumed current is below the predetermined level (that is, when the added voltage Vc is below 0.6V), the comparator 82 returns the process back to step S1, and repeats the steps subsequent thereto. In other words, the comparator 82 is constantly comparing the added voltage Vc (the level of the consumed current) with 0.6V (the level of the limit current Iinplimit).

For example, assuming that a current In equal to or greater than the limit current Iinplimit flows through the electrical path 75, in this case, as described above, because the added voltage Vc inputted to the negative input (−) of the comparator 82 exceeds 0.6V, the comparator 82, in step S2, determines that the level of consumed power is at or above the predetermined level, and outputs, in step S3, the power limit detection signal.

In step S4, the detection signal holding section 74 holds the power limit detection signal for the duration of the holding time T1.

Figure 5:
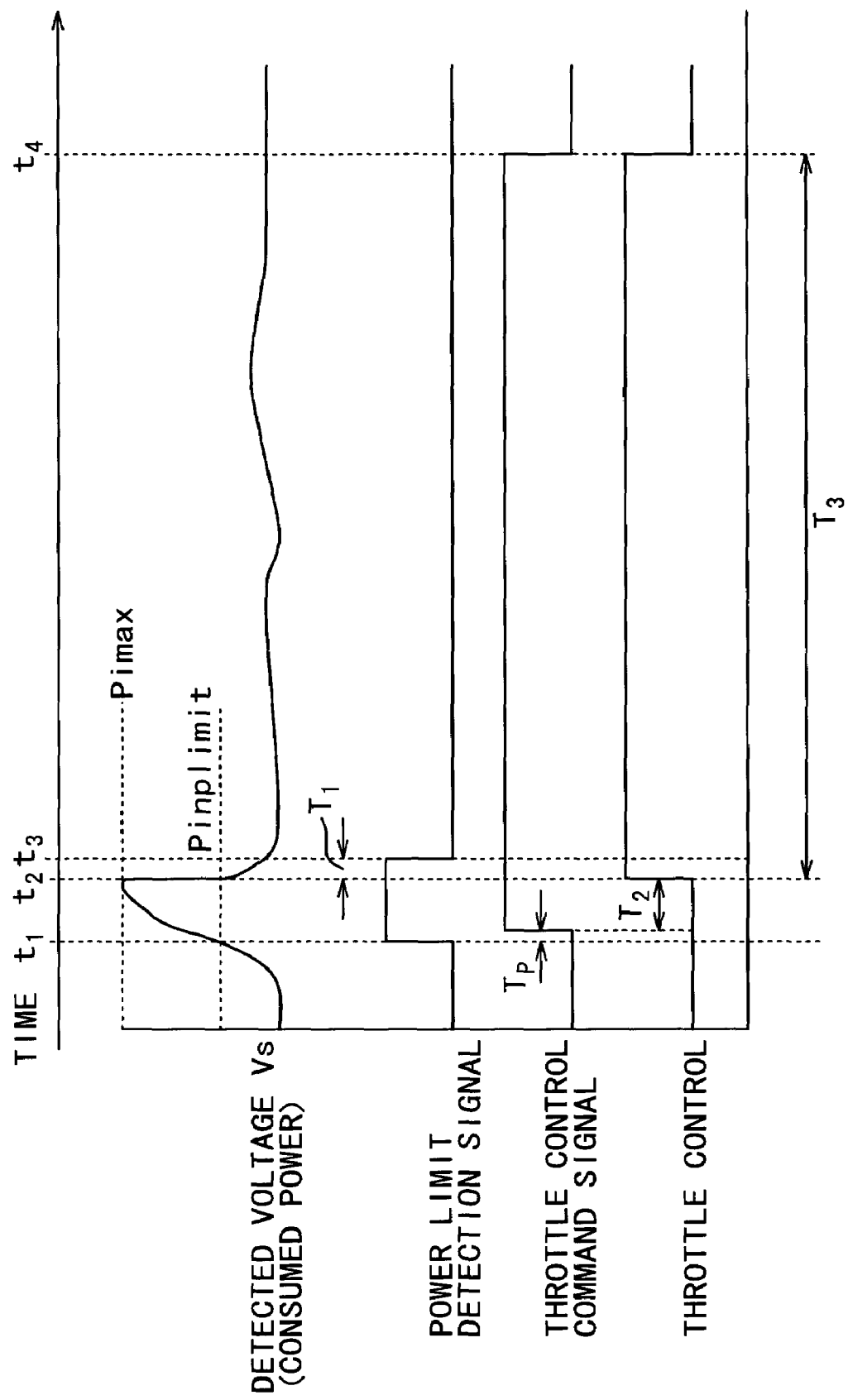
FIG. 5 is a time chart illustrating a power-saving control process of the information processing apparatus in FIG. 1.

In other words, if it is assumed, for example, that in FIG. 5, the comparator 82 outputs the power limit detection signal at time t1, and stops outputting at time t2, in this case, the detection signal holding section 74 starts outputting the power limit detection signal to the controller 40 at approximately time t1, and stops outputting at time t3 at which the holding time T1 has elapsed from time t2 (that is, after holding for the duration of the holding time T1).

By changing the time constant Rt/Ct, various times may be set as the holding time T1, but since, as described above, the controller 40 in the present example includes a microcomputer, it is desirable that the holding time T1 be equal to or greater than a polling cycle Tp of the controller 40. In the present example, if the polling cycle Tp of the controller 40 is 5 ms, the detection signal holding section 74 makes the holding time T1 equal to or greater than 5 ms, and holds the power limit detection signal accordingly.

In other words, the controller 40 detects (receives) the power limit detection signal, and outputs the throttle control command signal to the chip set 39, but detection intervals for this power limit detection signal are 5 ms (time Tp), and thus, unless the power limit detection signal is outputted for at least 5 ms, the power limit detection signal cannot be detected. In other words, as shown in FIG. 5, from the point where the power limit detection signal is outputted by the comparator 82 to the point where that power limit detection signal is detected by the controller 40 (or where the throttle control command signal is outputted to the chip set 39), there exists, at most, a delay corresponding to the polling cycle Tp. Therefore, at the detection signal holding section 74, the power limit detection signal is held for the duration of the polling cycle Tp (5 ms) of the controller 40 or longer.

Figure 4:
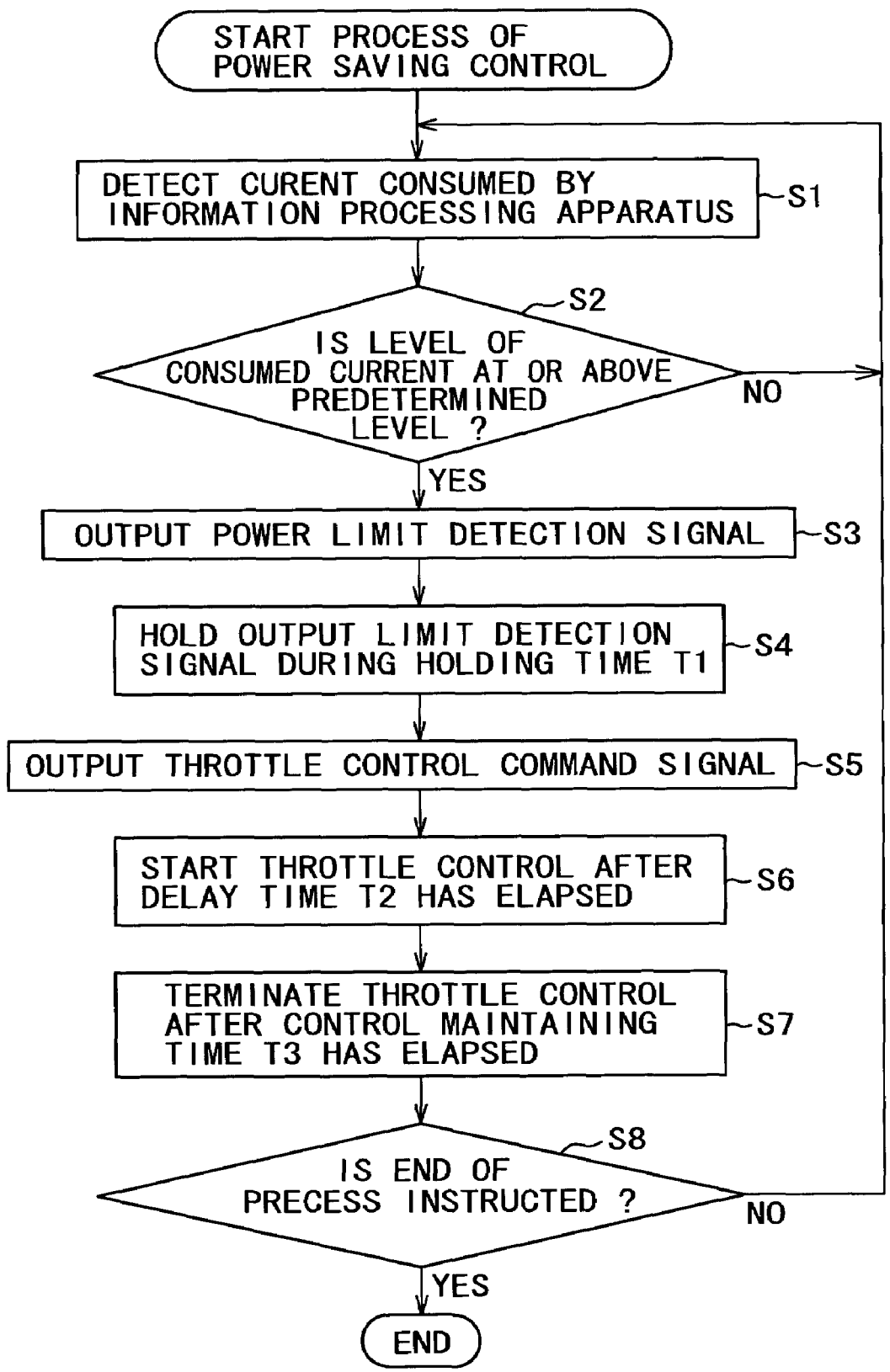
FIG. 4 is a flowchart illustrating a power-saving control process of the information processing apparatus in FIG. 1.

In step S5 in FIG. 4, the controller 40 outputs the throttle control command signal to the chip set 39.

In other words, as shown in FIG. 5, approximately at time t1 (some time within the polling cycle Tp (5 ms) from time t1), the throttle control command signal is inputted to the chip set 39.

With an ideal chip set 39, throttle control is initiated at the same time as the throttle control command signal is inputted, however, in actuality, there is a predetermined delay time T2 before the chip set 39 initiates throttle control. This delay time T2 is set for each chip set 39 in its specification, and in the present example is, for example, 2 s.

Therefore, in step S6 in FIG. 4, the chip set 39, as shown in FIG. 5, initiates throttle control after the delay time T2 (in the present example, 2 s) has elapsed from when the throttle control command signal is outputted by the controller 40 (from when the chip set 39 received the throttle control command signal) in step S5.

Thus, when the delay time T2 (to be more precise, delay time T2 (2 s)+polling cycle Tp (5 ms)=2.005 ms) has elapsed from time t1, at which the current In flowing through the electrical path exceeded the limit current Iinplimit (that is, when the power consumed by the information processing apparatus 1 exceeded the limit power Pinplimit), throttle control is initiated for the first time. In other words, during the period between time t1 and time t2, there is no control (throttle control is not performed), and a state in which the current In flowing through the electrical path is above the limit current Iinplimit continues. In other words, during the period between time t1 and time t2, the power consumed by the information processing apparatus 1 exceeds the limit power Pinplimit.

However, because the limit power Pinplimit defined in the design specification of the power device 41 is limited by heat generated by the power device 41, it is not managed by momentary values but instead as an average power value over a predetermined time. In other words, even if power is momentarily consumed in excess of the limit power Pinplimit, as long as the average power within a range of the specified peak power Pimax and the duty rate does not exceed the limit power Pinplimit, it is deemed to be within the range of the design specification of the power device 41. In the present example, the duty rate, for example, is a time that is below 10% of the total, and the average power (heat generated by the power device 41) is kept within the limit power Pinplimit, which is the rated power.

In this case, if the peak power Pimax is maintained during the delay time T2 (2 s) (in reality, as shown in FIG. 5, it is delay time T2+polling cycle Tp, but since the delay time T2 (2 s) is far longer than the polling cycle Tp (5 ms), it is assumed to be delay time T2), there is a need to perform throttle control for the duration of the control maintaining time T3 which is nine times the delay time T2 in order to keep the power consumed by the information processing apparatus (the average power) from exceeding the limit power Pinplimit.

Therefore, in step S7 in FIG. 4, the controller 40 terminates throttle control after the control maintaining time T3 (18 s) has elapsed from when throttle control is initiated by the chip set 39 in step S6 (that is, from when the throttle control command signal is outputted in step S5, and the delay time T2 has elapsed).

In other words, as shown in FIG. 5, the controller 40 outputs the throttle control command signal around time t1 (a time within the polling cycle Tp (5 ms) from time t1), and then, counts delay time T2+control maintaining time T3 (=2 s+18 s=20 s), and once counted at time t4, stops outputting the throttle control command signal.

The chip set 39 receives the throttle control command signal at around time t1 (that is, a time within the polling cycle Tp (5 ms) from time t1), initiates throttle control after the delay time T2 (2 s) has elapsed, continues throttle control while the throttle control command signal is received, and stops throttle control when the controller 40 stops supplying the throttle control command signal at time t4.

In step S8 in FIG. 4, the controller 40 determines whether or not termination of the process is instructed.

In step S8, if it is determined that termination of the process is yet to be instructed, the controller 40 returns the process to step S1, and repeats the steps subsequent thereto. In other words, until termination of the process is instructed, the current In flowing through the electrical path 75 is constantly monitored, and power saving control is performed.

If it is determined in step S8 that termination of the process has been instructed, the process is terminated.

Thus, the information processing apparatus 1 in FIG. 1 detects the power consumed by itself as the total current actually consumed by itself, and if the level of the current detected exceeds a predetermined limit level, throttle control is performed. Therefore, it becomes possible to lower the power consumed by the CPU 11 by a given rate.

In other words, the information processing apparatus 1 is capable of suppressing the power it consumes to a level below the capacity of the power device 41, that is, by applying the power saving control described above to various information processing apparatuses and not just the information processing apparatus 1 described above, designers can opt, for the power device 41, for power devices whose rated capacity is lower than is conventional. Therefore, the power device 41, which may include, for example, AC power adaptors and batteries, can be kept from becoming larger.

In addition, since the trigger for initiating throttle control is outputted as a signal from hardware (for example, the power saving control section 42 shown in FIG. 3), an OS, a software application or a control table is unnecessary, and as a result, inheriting and standardizing the power saving control is made easily achievable.

In addition, in reality, the power consumed by the information processing apparatus would only exceed the limit power Pinplimit in the rare case where the CPU, other chips, the built-in drive, and a device that may be connected to the external device connector terminal are operating to their fullest capacity at the same time. In other words, in most cases, the power consumed by the information processing apparatus does not exceed the limit power Pinplimit, and hence, through the power saving control mentioned above, it is possible to make full use of the CPU performance without having any restrictions placed upon the operation of the CPU.

The detection of current, which is necessary in order to perform the power saving control related to an embodiment of the present invention, is not limited to the detection of the current In flowing through the electrical path 75 in FIG. 2 described above, and regardless of whether it is inside or outside the information processing apparatus 1, it need only be detection of a current which flows through an electrical path through which a current that contributes to an increase or decrease in the power consumed by the information processing apparatus 1 flows. For example, it may be detection of a current flowing through the CPU 11, or detection of a current flowing through the USB bus 57.

Also, modern CPUs are equipped with temperature managing mechanisms for the processor, which include a thermal sensor and a TCC (Thermal Control Circuit) provided on the die to measure the temperature of the die. When the measured value exceeds a predetermined temperature, the TCC reduces power consumption by periodically and repeatedly pausing processes internal to the processor core at a given cycle, and lowers the temperature by reducing the amount of heat generated. The power saving control related to the present invention may be performed directly on a control terminal shared with a monitor and provided on the CPU (for example, a PROCHOT# terminal) like the TCC.

Power saving control for the CPU may be performed by using the present invention in combination with other methods of reducing power consumption such as the Speed Step Technology (registered trademark) in which power consumption is reduced by suppressing the operating speed of the CPU and by controlling the temperature managing mechanism of the processor.

There are various types of temperature managing mechanisms for the processor including those in which the thermal sensor and the thermal control circuit are incorporated internally in the CPU in advance, or those in which, in accordance with a detection signal of the thermal sensor provided on the outside of the CPU, operations of the CPU are periodically and repeatedly paused or the operating frequency is reduced. When applying the latter control that is based on the detection signal of the external thermal sensor to the embodiment described above, the detection signal of the external thermal sensor is monitored by the controller 40, and the throttle control command signal is outputted to the chip set 39 when a predetermined temperature is exceeded. The chip set 39 that has received the throttle control command signal performs throttle control on the CPU 11.

Although in the embodiment above, control was performed utilizing power saving functions of the CPU, so long as they have power saving functions, other chips, too, for example a video controller chip, may also be controlled similarly.

The series of processes described above are performable by hardware, but they may also be performed through software. In performing the series of processes by software, a program or programs constituting the software is installed, for example, from a recoding medium, to a computer that is incorporated into dedicated hardware or to a general-purpose personal computer that can execute various functions by having various programs installed.

The recording medium includes, as shown in FIG. 1, not only packaged media distributed separately from the personal computer to provide programs to users such as the magnetic disk 61 (including a flexible disk), the optical disk 62 (including a CD-ROM (Compact Disc-Read Only Memory) and a DVD (Digital Versatile Disc)), a magneto-optical disk (including an MD (Mini-Disc) (registered trademark)), a semiconductor memory 64 and the like, but also a hard disk including a ROM or the HDD 27 in which programs are stored and which is provided to users in a state where it is incorporated into the computer in advance.

In the present specification, the steps describing the program may be processed chronologically in the order described above, or alternatively, they may be executed in parallel or individually instead of being processed chronologically.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An information processing apparatus, comprising:
   detection means for detecting a current flowing through a predetermined electrical path in said information processing apparatus;
   first output means for outputting, when a level of said current detected by said detection means exceeds a predetermined limit level, a first signal indicating so;
   second output means for outputting, when said first signal is outputted by said first output means, a second signal commanding that a clock frequency of said information processing apparatus be reduced;
   frequency control means for controlling such that, when said second signal is outputted by said second output means, said clock frequency of said information processing apparatus is reduced by utilizing a throttling function of said information processing apparatus after a first period of time elapses from when said second signal is outputted by said second output means; and
   terminating means for terminating a control of said frequency control means after a second period of time that is predetermined based on said first period of time elapses from when control by said frequency control means is initiated.

2. The information processing apparatus according to claim 1, wherein
   said electrical path is a power line through which power is supplied to said information processing apparatus from a predetermined power supplying device, and
   said second period of time is predetermined based on said first period of time so that the average power consumed by said information processing apparatus within a range of a peak power defined as a specification of said power supplying device and a duty rate does not exceed a power corresponding to said limit level.

3. The information processing apparatus according to claim 1, wherein
   said second output means includes a microcomputer,
   said information processing apparatus further comprises holding means for holding said first signal outputted by said first outputting means for a third period of time that is at least as long as a polling cycle of said microcomputer, and for outputting said first signal, and
   said second output means outputs said second signal when said first signal held by said holding means is detected.

4. The information processing apparatus according to claim 1, wherein
   said electrical path is, of power lines through which power is supplied from a predetermined power supplying device to said information processing apparatus, a current passing line through which all current to be consumed by said information processing apparatus flows,
   a limit value for the current flowing through said current passing line is predetermined based on a capacity of said power supplying device,
   said detection means detects all of said current that is to be consumed by said information processing apparatus and that flows through said current passing line, and
   said first output means outputs said first signal when said level of said current detected by said detection means exceeds said limit level corresponding to said predetermined limit value for said current.

5. The information processing apparatus according to claim 4, wherein
   said information processing apparatus is capable of using a plurality of kinds of said power supplying device,
   a limit value of a current flowing through said current passing line is predetermined for each of said plurality of kinds of power supplying devices based on a capacity thereof,
   when said information processing apparatus uses a first power supplying device, said first output means outputs said first signal when said level of said current detected by said detection means exceeds a first limit level corresponding to said limit value of said current predetermined for said first power supplying device, and
   when said information processing apparatus uses a second power supplying device, said first output means outputs said first signal when said level of said current detected by said detection means exceeds a second limit level corresponding to said limit value of said current predetermined for said second power supplying device.

6. The information processing apparatus according to claim 5, wherein said first power supplying device includes a power supplying device of commercial AC power, and said second power supplying device includes a battery.

7. The information processing apparatus according to claim 4, wherein
   said detection means includes a detector resistor for detecting a current passing through said current passing line as a voltage value across both ends thereof, and
   said first output means includes:
      a comparator for comparing the value of a first input to which said level of said current detected by said detection means is inputted and the value of a second input to which said limit level is inputted, and for outputting said first signal when said value of said first input exceeds said value of said second input;
      first supplying means for computing said current level based on a voltage across both ends of said detector resistor in a case where a current actually consumed at that point by said information processing apparatus is flowing through said current passing line and on an output voltage of said power supplying device, and for supplying said computed current level to said first input of said comparator; and
      second supplying means for supplying, in a case where a current of said limit value that is predetermined based on said capacity of said power supplying device is flowing through said current passing line, to said second input of said comparator as said limit level a level that is identical with said current level supplied to said first input of said comparator from said first supplying means.

8. The information processing apparatus according to claim 1, further comprising:
   a CPU; and
   a sensor that measures a temperature of said CPU and outputs a measured value, wherein
   said second output means also outputs said second signal when said measured value outputted from said sensor exceeds a predetermined value.

9. The information processing apparatus according to claim 1, further comprising a CPU which includes a control terminal shared with a monitor, and which executes control which is control for said control terminal and where its own operations are periodically and repeatedly paused at a predetermined cycle, wherein
   said CPU obtains said second signal via said control terminal when said second signal is outputted by said second output means, and performs said control for said control terminal.

10. The information processing apparatus according to claim 1, further comprising a video controller chip having a power saving function and which performs said power saving function when said second signal is outputted by said second output means.

11. An information processing method for an information processing apparatus, comprising:

- a detection step for detecting a current flowing through a predetermined electrical path in said information processing apparatus;
- a first output step for outputting, when a level of said current detected in said detection step exceeds a predetermined limit level, a first signal indicating so;
- a second output step for outputting, when said first signal is outputted in said first output step, a second signal commanding that a clock frequency of said information processing apparatus be reduced;
- a frequency control step for controlling, when said second signal is outputted in said second output step, such that said clock frequency of said information processing apparatus is reduced by utilizing a throttling function of said information processing apparatus after a first period of time elapses from when said second signal is outputted by said second output means; and
- a terminating step for terminating a control in said frequency control step after a second period of time that is predetermined based on said first period of time elapses from when control in said frequency control step is initiated.

12. A computer readable storage medium embodying a program for causing a computer controlling an information processing apparatus to execute:

- a detection step for detecting a current flowing through a predetermined electrical path in said information processing apparatus;
- a first output step for outputting, when a level of said current detected in said detection step exceeds a predetermined limit level, a first signal indicating so;
- a second output step for outputting, when said first signal is outputted in said first output step, a second signal commanding that a clock frequency of said information processing apparatus be reduced;
- a frequency control step for controlling, when said second signal is outputted in said second output step, such that said clock frequency of said information processing apparatus is reduced by utilizing a throttling function of said information processing apparatus after a first period of time elapses from when said second signal is outputted by said second output means; and
- a terminating step for terminating a control of said frequency control step after a second period of time that is predetermined based on said first period of time elapses from when control by said frequency control step is initiated.

* * * * *